US008562726B2

(12) United States Patent
Jun et al.

(10) Patent No.: US 8,562,726 B2
(45) Date of Patent: Oct. 22, 2013

(54) CHAMBER AIR CLEANER AND AN INTAKE APPARATUS FOR ENGINE INCLUDING THE SAME

(75) Inventors: Je Hui Jun, Suwon-si (KR); Young Hak Jang, Seoul (KR); Woo Min Jung, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 64 days.

(21) Appl. No.: 13/349,335

(22) Filed: Jan. 12, 2012

(65) Prior Publication Data

US 2013/0118434 A1 May 16, 2013

(30) Foreign Application Priority Data

Nov. 14, 2011 (KR) ........................ 10-2011-0118021

(51) Int. Cl.
*F02M 35/10* (2006.01)
*B01D 46/00* (2006.01)

(52) U.S. Cl.
USPC .................. 96/386; 55/481; 55/480; 55/502; 55/506; 55/521; 55/385.3; 55/420; 96/400; 96/421; 123/198 E

(58) Field of Classification Search
USPC ................ 55/385.3, 481, 480, 502, 506, 521, 55/DIG. 28, DIG. 30; 123/198 E, 184.53, 123/90.11, 345, 179.4
See application file for complete search history.

(56) References Cited

U.S. PATENT DOCUMENTS

| | | | |
|---|---|---|---|
| 7,396,375 B2 * | 7/2008 | Nepsund et al. | 55/481 |
| 2007/0151536 A1 * | 7/2007 | Yamauchi et al. | 123/179.4 |
| 2009/0007875 A1 * | 1/2009 | Sano et al. | 123/184.53 |
| 2009/0178646 A1 * | 7/2009 | Takahashi et al. | 123/345 |

FOREIGN PATENT DOCUMENTS

| | | |
|---|---|---|
| JP | 2003-74426 A | 3/2003 |
| JP | 2009-127425 A | 6/2009 |
| KR | 10-0680372 B1 | 2/2007 |
| KR | 10-2009-0131582 A | 12/2009 |
| KR | 10-0966615 B1 | 6/2010 |

* cited by examiner

*Primary Examiner* — Duane Smith
*Assistant Examiner* — Minh-Chau Pham
(74) *Attorney, Agent, or Firm* — Morgan, Lewis & Bockius LLP

(57) ABSTRACT

A chamber air cleaner apparatus may include a chamber housing mounted through a connector onto an air hose wherein the air hose may be connected to a main air cleaner, an intake duct attached to an outer surface of the chamber housing wherein exterior air may be introduced into the chamber housing through the intake duct, a variable valve pivotally installed in the vicinity of the intake duct and selectively opening according to an air suction pressure applied thereto, and a filter element mounted between the intake duct and the connector within the chamber housing to purify the introduced air through the intake duct.

3 Claims, 7 Drawing Sheets

CHAMBER AIR CLEANER AND AN INTAKE APPARATUS FOR ENGINE INCLUDING THE SAME

CROSS-REFERENCE TO RELATED APPLICATION

The present application claims priority to Korean Patent Application No. 10-2011-0118021 filed on Nov. 14, 2011, the entire contents of which is incorporated herein for all purposes by this reference.

BACKGROUND OF THE INVENTION

1. Field of the Invention

The present invention relates to a chamber air cleaner and an intake apparatus for an engine including the same. More particularly, it relates to a chamber air cleaner for increasing an amount of air supplied into an engine and reducing noise through an opening/closing operation of a variable valve, and an intake apparatus for an engine including the same.

2. Description of Related Art

In general, an intake apparatus for an engine is adapted to supply exterior air into an engine to drive the engine, and is configured as illustrated in FIG. 1 or disclosed Korean Patent Application Publication No. 2010-0060293. FIG. 1 is a plan view of a conventional intake apparatus for an engine.

As illustrated in FIG. 1, the intake apparatus for an engine passes air suctioned from the outside into a duct 10 through a main air cleaner 20 to remove foreign substances. The intake apparatus for an engine includes an air hose 30 for supplying purified air into an engine, and is configured to reduce and remove noise of a specific frequency band from noise generated when air is suctioned by using a resonator 40.

Then, the main air cleaner 20 can be exploded as in FIG. 2 or as disclosed in Korean Patent No. 10-0177074. FIG. 2 is an exploded perspective view illustrating a main air cleaner of the conventional intake apparatus for an engine.

As illustrated in FIG. 2, a general main air cleaner 20 includes a lower case 21 in which a duct 10 for suctioning exterior air is disposed, an upper case 22 disposed to cover an upper end of the lower case 21, and a filter element 23 fixed and disposed to be caught or inserted around an upper end of the lower case 21 to purify the air suctioned through the duct 10. The air having passed through the filter member 23 is supplied into an engine through an air hose 30 connected to the upper case 22.

However, if the conventional intake apparatus for an engine is applied to a travelling vehicle, an amount of air suctioned and supplied into the engine is small, degrading an output of the vehicle as compared with that of a competitive company. This gives consumers of the finished vehicle a bad impression, degrading product value.

In addition, there is a difficulty in increasing an amount of air supplied into an engine and inducing an inflow of exterior air due to a too complicated and confined engine room space.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a chamber air cleaner for increasing an amount of air supplied into an engine and reducing noise by utilizing a confined space most efficiently, and an intake apparatus for an engine including the same.

The object of the present invention is not limited to the above-mentioned object, and other unmentioned objects will be clearly understood by those skilled in the art from the following description.

In an aspect of the present invention, a chamber air cleaner apparatus may include a chamber housing mounted through a connector onto an air hose wherein the air hose is connected to a main air cleaner, an intake duct attached to an outer surface of the chamber housing wherein exterior air is introduced into the chamber housing through the intake duct, a variable valve pivotally installed in the vicinity of the intake duct and selectively opening according to an air suction pressure applied thereto, and a filter element mounted between the intake duct and the connector within the chamber housing to purify the introduced air through the intake duct.

The filter element is slidably mounted to the chamber housing through a hole formed to a chamber cover configured to cover the chamber housing such that the air introduced from the intake duct is purified through the filter element.

The variable valve is closed when the air suction pressure is below a predetermined value such that air is not introduced into the intake duct and is opened when the air suction pressure is beyond the predetermined value such that air is introduced into the intake duct.

A first magnet fixed to an end of the variable valve is attached to a second magnet fixed to the vicinity of the intake duct when the air suction pressure is below a predetermined value such that air is not introduced into the intake duct due to a magnetic force between the first and second magnets being stronger than the air suction pressure, and the first magnet is separated from the second magnet when the air suction pressure is beyond the predetermined value such that air is introduced into the intake duct due to the magnetic force between the first and second magnets being weaker than the air suction pressure.

In another aspect of the present invention, an intake apparatus for an engine, may include a duct through which exterior air is introduced, a main air cleaner connected to the duct to purify the air introduced into the duct an air hose connected to the main air cleaner such that the air having passed through the main air cleaner is flown out therethrough, a resonator mounted to the air hose to reduce noise, and a chamber air cleaner mounted to the air hose to reduce noise when an air suction pressure in the chamber air cleaner is below a predetermined value and to increase an amount of introduced air therein when the air suction pressure in the chamber air cleaner is beyond the predetermined value, wherein the chamber air cleaner may include a chamber housing mounted through a connector onto the air hose, an intake duct attached to an outer surface of the chamber housing wherein exterior air is introduced into the chamber housing through the intake duct, a variable valve pivotally installed in the vicinity of the intake duct and selectively opening according to an air suction pressure applied thereto, and a filter element mounted between the intake duct and the connector within the chamber housing to purify the introduced air through the intake duct.

The present invention has the following effects.

The chamber air cleaner and an intake apparatus for an engine including the same according to the present invention can reduce noise as a variable valve is operated at a resonator in a low-speed section when it opens or closes an intake duct and increase an output of a vehicle as the variable valve is operated as an air intake opening in a high-speed section.

Further, the present invention does not require a large space, and can be applied to a conventional layout without a large change even for a complicated and confined engine room space.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
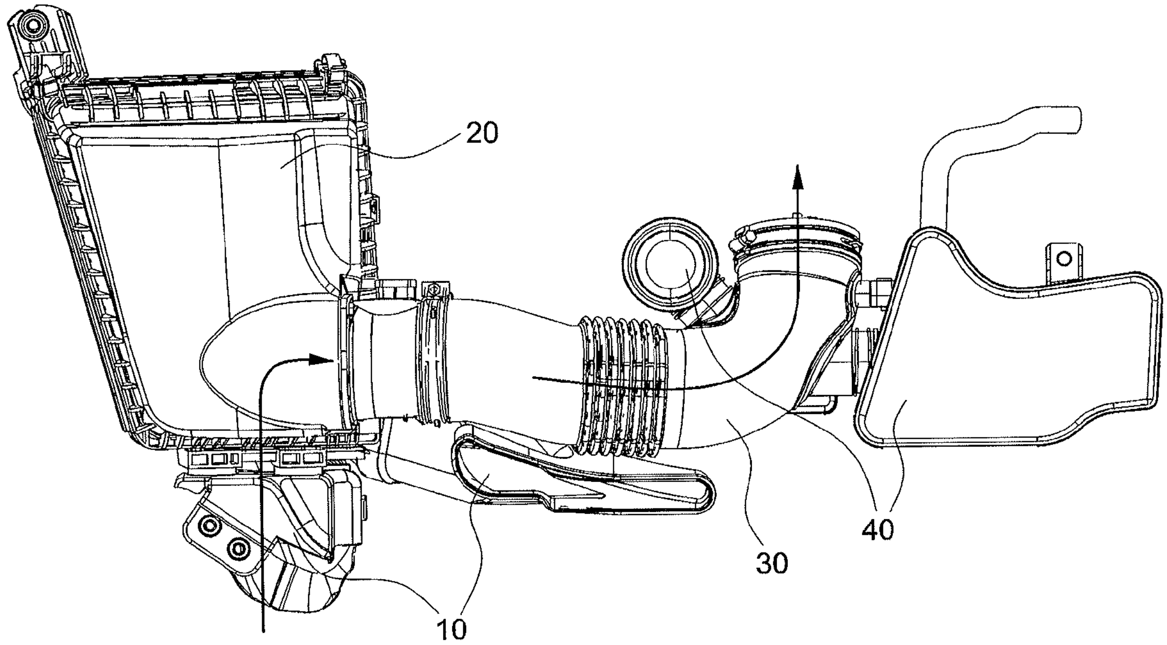
FIG.1 (Prior Art)
FIG. 1 is a plan view illustrating a conventional intake apparatus for an engine.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in more detail with reference to the accompanying drawings.

Figure 3:
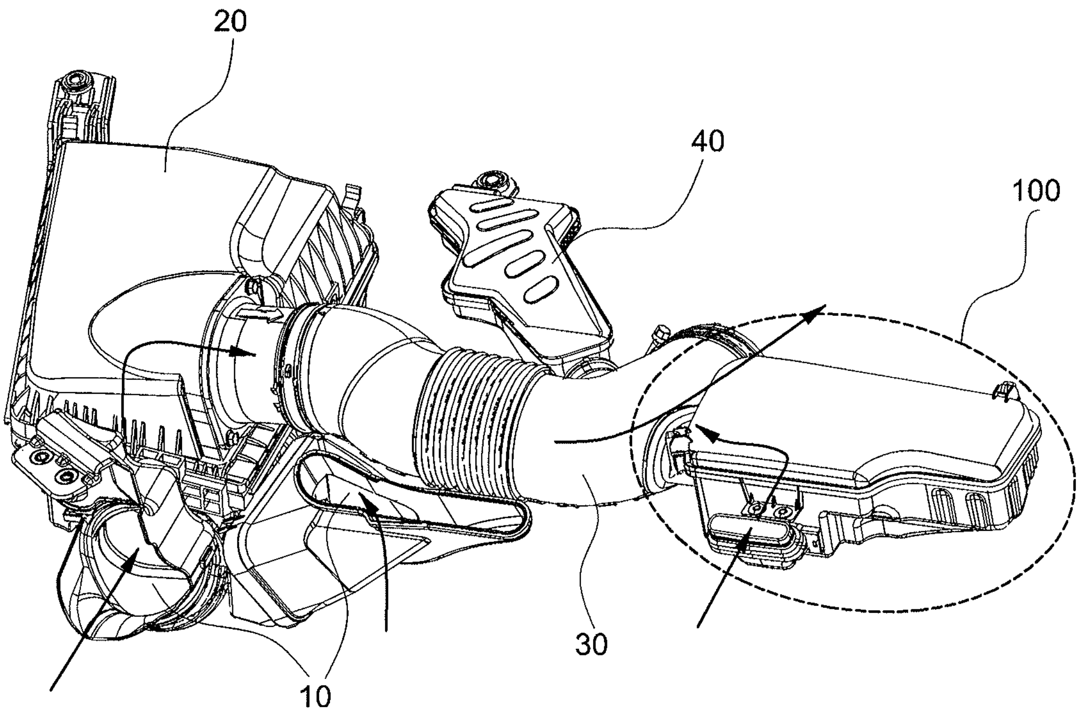
FIG. 3 is a perspective view illustrating an intake apparatus for an engine including a chamber air cleaner according to an exemplary embodiment of the present invention.

FIG. 3 is a perspective view illustrating an intake apparatus for an engine including a chamber air cleaner according to an exemplary embodiment of the present invention.

The intake apparatus for an engine including a chamber air cleaner according to the exemplary embodiment of the present invention includes: a duct 10 disposed such that exterior air is introduced therethrough, a main air cleaner 20 connected to the duct 10 to purify the air introduced into the duct 10, an air hose 30 installed such that the air having passed through the main air cleaner 20 is introduced into the engine therethrough, a resonator 40 mounted to the air hose 30 to reduce noise, and a chamber air cleaner 100 mounted to the air hose 30 to reduce noise in a low-speed section and increase an amount of introduced air at a high-speed section. The chamber air cleaner 100 includes: a chamber housing 110 mounted on the air hose 30 through a connector 112, an intake duct 120 disposed to introduce exterior air into the chamber housing 110 therethrough, a variable valve 130 installed in the vicinity of the intake duct 120 to be opened or closed, and a filter element 140 mounted within the chamber housing 110 to purify the introduced air.

The duct 10 of the present invention is disposed to introduce exterior air therethrough and is connected to the below-described main air cleaner 20. The duct 10 may be configured to have a shape similar to that of the below-described intake duct 120 of the chamber air cleaner 100.

Figure 2:
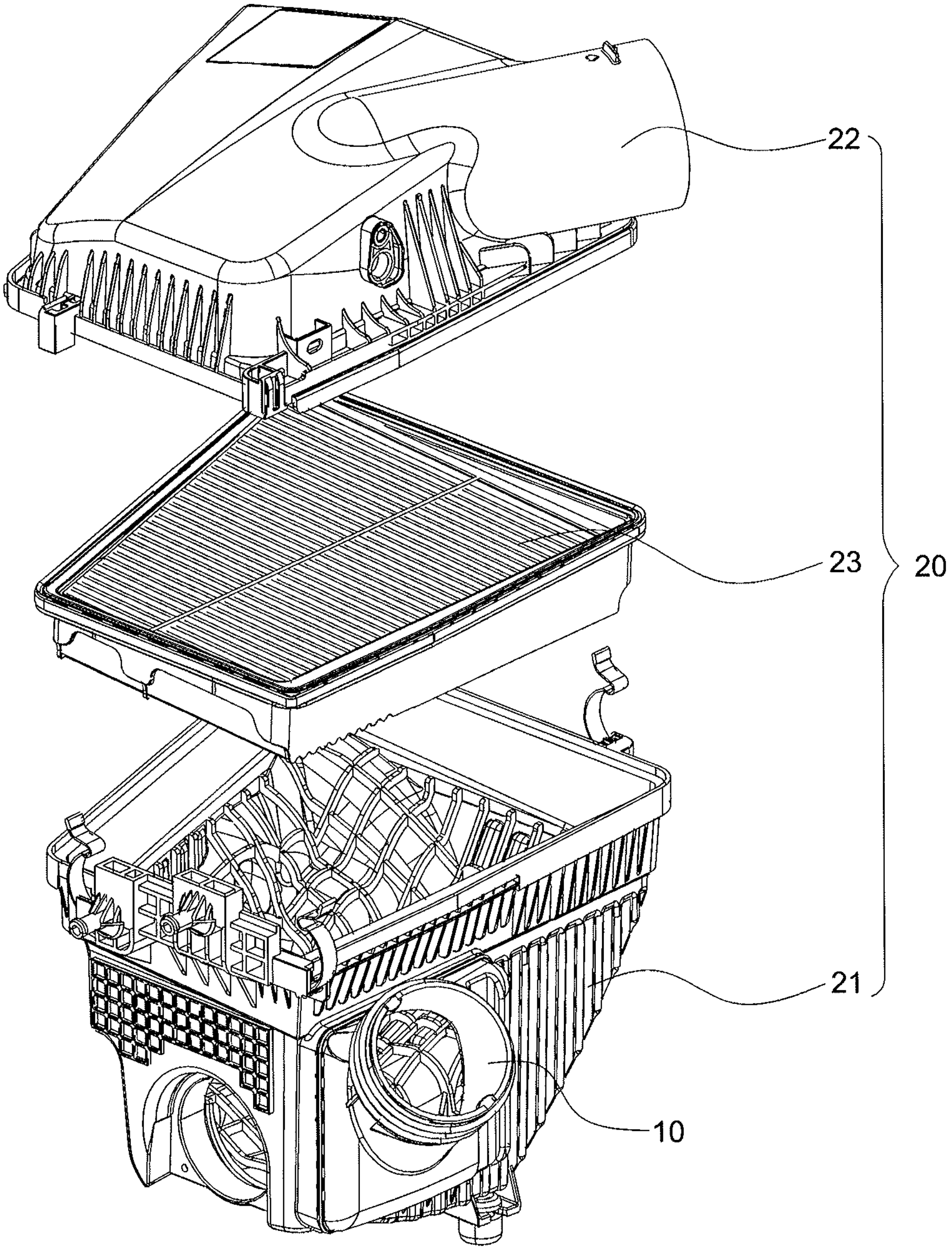
FIG.2 (Prior Art)
FIG. 2 is an exploded perspective view illustrating a main air cleaner of the intake apparatus of FIG. 1.

The main air cleaner 20 is configured to purify the air introduced from the duct 10, and a filter member for filtering foreign substances is installed within the main air cleaner 20. The filter member preferably has a maximum cross-section. As illustrated in FIG. 2, the filter member 23 is generally fixed and disposed to be caught or inserted around an upper end of the lower case 21, and an upper case 22 and a lower case 21 are coupled to each other to seal an interior of the main air cleaner 20.

The air hose 30 is installed such that the air having passed through the above-described main air cleaner is introduced into the engine, and the resonator 40 for reducing noise and the chamber air cleaner 100 are mounted to the air hose 30.

Hereinafter, it will be easily understood by those skilled in the art to which the present invention pertains that a description of the chamber air cleaner 100 of an intake apparatus for an engine including the chamber air cleaner according to the exemplary embodiment of the present invention can be applied to the chamber air cleaner 100 according to the exemplary embodiment of the present invention.

Figure 4A:
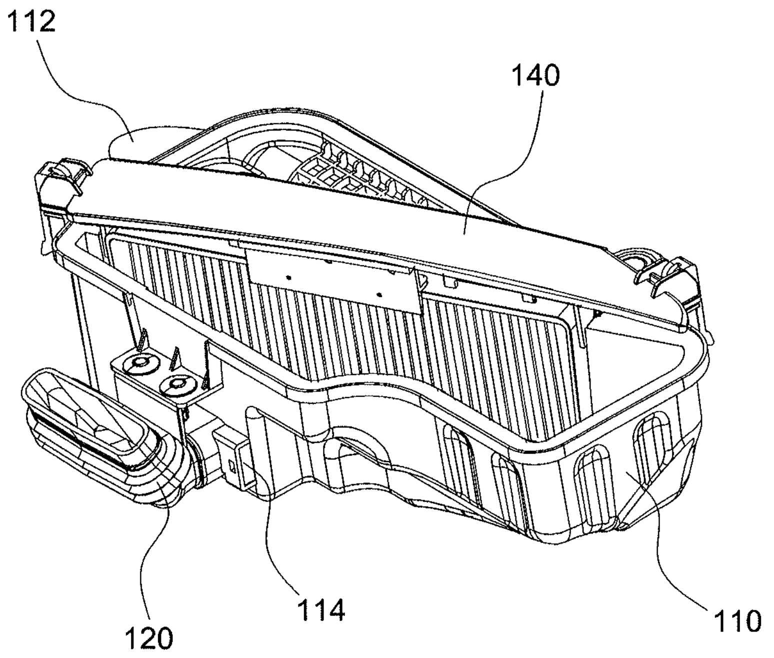
FIG. 4A is a perspective view illustrating the chamber air cleaner according to the exemplary embodiment of the present invention.
Figure 4B:
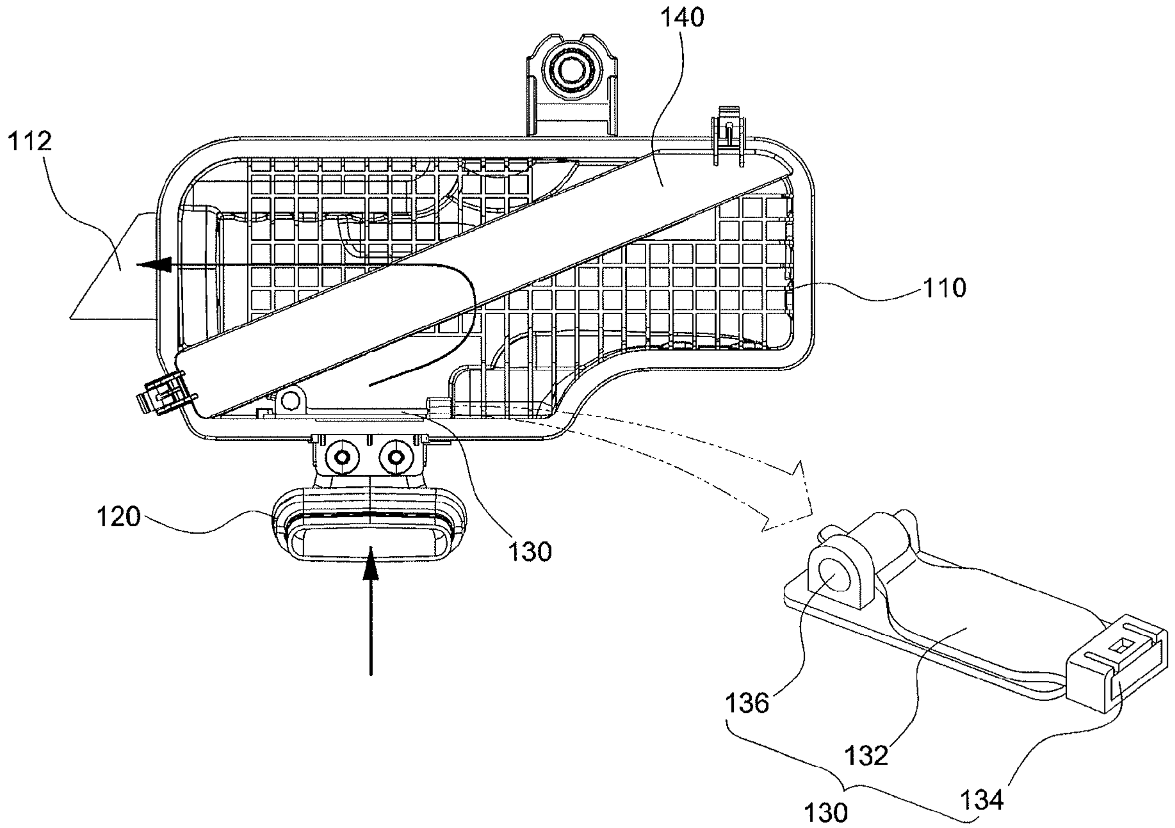
FIG. 4B illustrates a plan view of the chamber air cleaner according to the exemplary embodiment of the present invention and a variable valve.

The chamber air cleaner 100 of the present invention will be described with reference to FIGS. 4A and 4B. FIG. 4A is a perspective view of the chamber air cleaner according to the exemplary embodiment of the present invention, and FIG. 4B illustrates a plan view and a variable valve.

The chamber housing 110 is mounted to the above-described air hose 30 through the connector 112. The chamber housing 110 has a space for accommodating the filter element 140 therein, and holes for sufficient air flows are formed on a side surface of the chamber housing 110 connected to the air hose 30 and a side surface of the chamber housing 110 connected to the below-described intake duct 120. In addition, the chamber housing 110 may be designed to have a size within a range its layout allows, and may be manufactured of a material the same as that of the main air cleaner 20. Moreover, a second magnet 114 may be installed in the vicinity of the chamber housing 110, in particular, the below-described intake duct 120, and may be operated in relation to the opening/closing operation of the variable valve 130.

In the same way that the above-described duct 10 introduces exterior air into the main air cleaner 20 therethrough, the intake duct 120 is disposed to introduce exterior air into the chamber housing 110 therethrough. That is, if a suction pressure is applied to the exterior air introduced into the intake duct 120, air flows into the chamber housing 110 through the hole on a side surface of the chamber housing 110 connected to the suction duct 120. In addition, a disposition of the intake duct 120 and a location of the hole on the chamber housing 110 connected to the intake duct 120 may be changed within a range the layout allows. Moreover, rectangular or circular cross-sections are widely used for the suction duct 120, or an elliptical shape may be used. An insulating material may be wound around the suction duct 120 to be used to prevent a transfer of heat generated by a difference between a temperature of air flowing through the intake duct 120 and a peripheral temperature.

The variable valve 130 is installed in the vicinity of the above-described intake duct 120. In particular, the variable valve 130 is closed at a low-speed section such that air cannot be introduced therethrough, and is opened at a high-speed section such that air can be introduced therethrough. A high-speed section refers to a case where there is a suction pressure sufficient to open the variable valve 130, and exterior air can be introduced from the intake duct 120 into the chamber housing 110 in the high-speed section. The low-speed section refers to a case opposite to the high-speed section. They are preferably divided with reference to 5,000 RPM.

As illustrated in FIG. 4B, the variable valve 130 may include a body 132 for substantially blocking the exterior air introduced from the intake duct 120, a first magnet 134 interacting with the second magnet 114 installed in the chamber housing 110, and a shaft 136 acting as a rotary shaft in an opening/closing operation of the variable valve 130. The opening/closing operation of the variable valve 130 will be described later.

The filter element 140 of the present invention is mounted within the above-described chamber housing 110 to purify the introduced air. The filter element 140 may be mounted in a tape-inserting manner so that the air introduced into the air hose from the intake duct 120 through the connector 112 can be purified. It may cause a problem due to a narrow space of an engine room if the filter element 140 is disposed within the chamber air cleaner 100 in the way where the filter member 23 is disposed within the main air cleaner 20. Accordingly, as illustrated in FIG. 4A, the filter element 140 may be designed to be erected and inserted in a diagonal direction of the chamber air cleaner 100.

Figure 4C:
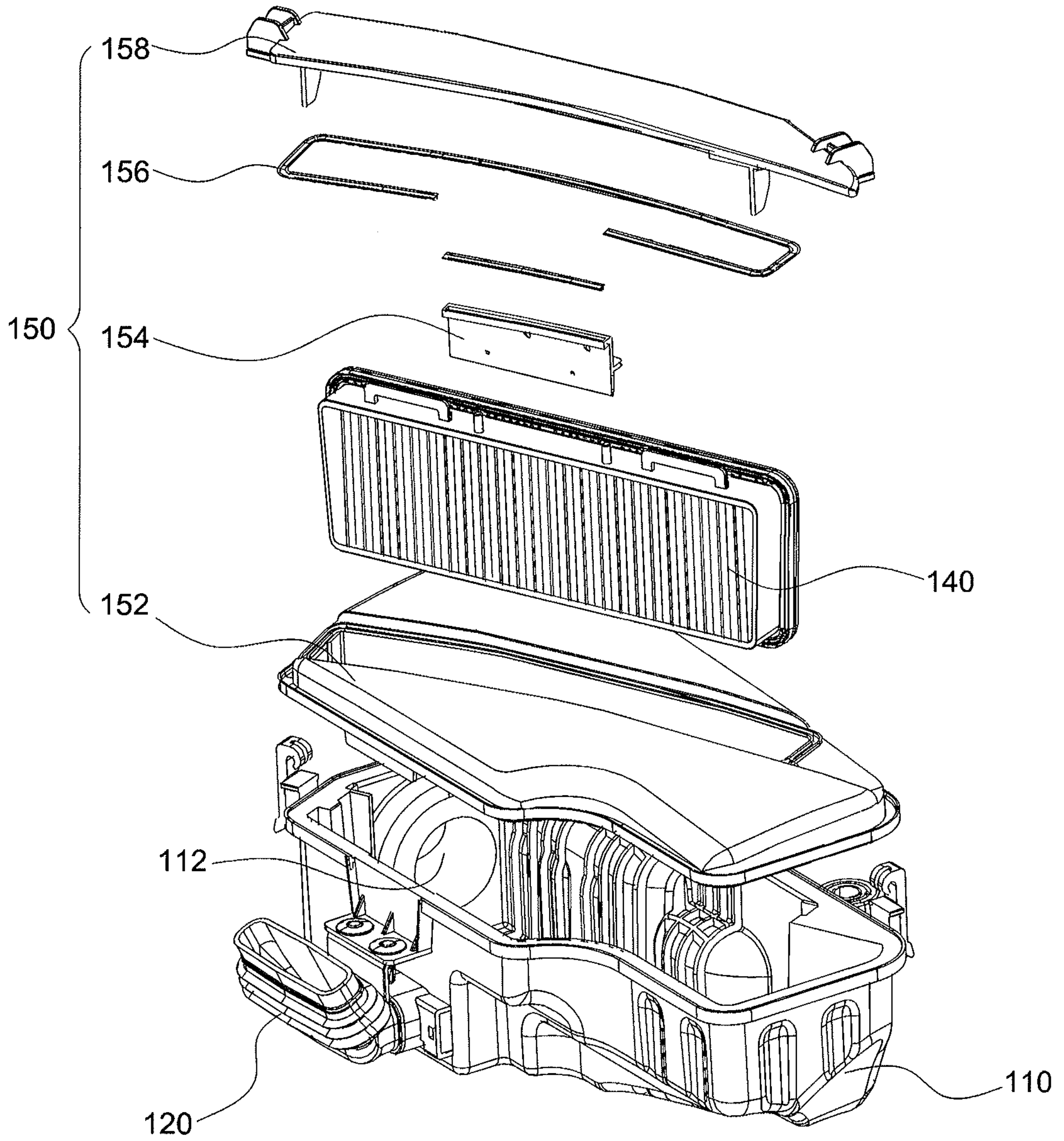
FIG. 4C is an exploded perspective view illustrating the chamber air cleaner according to the exemplary embodiment of the present invention.

Meanwhile, the coupling of the elements of the chamber air cleaner 100 will be described with reference to FIG. 4C. FIG. 4C is an exploded perspective view illustrating the chamber air cleaner according to the exemplary embodiment of the present invention.

As illustrated in FIG. 4C, the chamber housing 110 having the connector 112 and the intake duct 120 is disposed first, and an upper end of the chamber housing 110 is disposed to be covered by a chamber cover 152, and is coupled to the chamber housing 110. The filter element 140 passes through a hole 151 formed in a diagonal direction of the chamber housing 110 on the chamber cover 152, and is received into the chamber housing 110 in a tape-inserting manner. An element fixing bracket 154 is attached to maintain the received state, and a gasket 156 for sealing is installed. The element cover 158 covers the hole 151 formed in the diagonal direction of the chamber housing 110.

Figure 5:
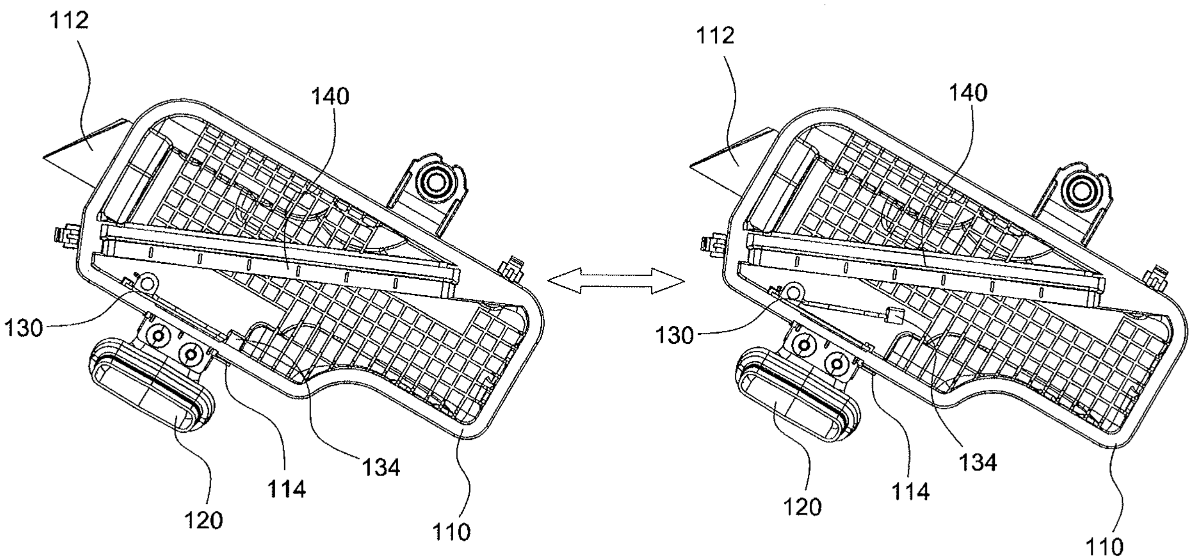
FIG. 5 is a view illustrating an opening/closing operation of the variable valve of the chamber air cleaner according to the exemplary embodiment of the present invention.

In addition, a detailed opening/closing operation of the variable valve 130 will be described with reference to FIG. 5. FIG. 5 illustrates an opening/closing operation of the variable valve in the chamber air cleaner according to the exemplary embodiment of the present invention. The low-speed section illustrated on the left of FIG. 5 and the high-speed section illustrated on the right of FIG. 5 are preferably divided with reference to 5,000 RPM, and an attractive force between the first magnet 134 and the second magnet 114 is preferably regulated according to the reference.

As illustrated on the left side of FIG. 5, the first magnet 130 may be attached to the second magnet 114 attached to the vicinity of the intake duct 120 so that air cannot be introduced due to a magnetic force of the first magnet 134 attached to the variable valve 130, the magnetic force of the first magnet being stronger than a suction pressure. That is, since exterior air is not introduced from the intake duct 120 through the variable valve 130 in the low-speed section, the chamber air cleaner 100 can be operated as a resonator 40 for reducing noise. In other words, noise is generated as a suction sound of the engine produces a resonance in the air hose 30, in which case the chamber air cleaner 100 can be used to reduce NVH (Noise, Vibration, and Harshness) including the noise. Then, the chamber air cleaner 100 is preferably manufactured to have a certain volume in response to a frequency of noise, and the chamber air cleaner 100 may replace the conventional resonator 40.

As illustrated on the right side of FIG. 5, the first magnet 134 may be separated from the second magnet 114 in the high-speed section such that air is introduced due to a magnetic force of the first magnet being weaker than a suction pressure. That is, since air introduced from the conventional duct 10 and air introduced through the intake duct 120 are supplied into the engine through the air hose 30 in the high-speed section, an output of the vehicle is improved.

An experimental result obtained by using the conventional intake apparatus for an engine and an intake apparatus for an engine including the chamber air cleaner according to the exemplary embodiment of the present invention is as follows.

TABLE 1

| | Suction Pressure [kpa] | Backpressure [kPa] | Maximum Output [PS] | Effect |
|---|---|---|---|---|
| Conventional | −6 | 84 | 412 | — |
| Present Invention | −5.7 | ↑ | 414 | Suction Pressure 0.3 kPa↓, Maximum Output 2.0 PS ↑ |

The test engine used for the experiment is Tau 5.0 GDI engine, and the suction pressures, the backpressures, and the maximum outputs are obtained at 6,400 RPM. Accordingly, a suction pressure is enhanced by 0.3 kPa and a maximum output is enhanced by 2 PS.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An intake apparatus for an engine, comprising;

a main duct through which exterior air is introduced;

a main air cleaner connected to the main duct to purify the air introduced into the main duct;

an air hose connected to the main air cleaner such that the air having passed through the main air cleaner is exits therethrough;

a resonator mounted to the air hose to reduce noise; and a chamber air cleaner mounted to the air hose to reduce noise when an air suction pressure in the chamber air cleaner is below a predetermined value and to increase an amount of introduced air therein when the air suction pressure in the chamber air cleaner is beyond the predetermined value, wherein the chamber air cleaner includes:

a chamber housing mounted through a connector onto the air hose;

an intake duct attached to an outer surface of the chamber housing wherein exterior air is introduced into the chamber housing through the intake duct;

a variable valve pivotally installed in the vicinity of the intake duct and selectively opening according to an air suction pressure applied thereto; and a filter element mounted between the intake duct and the connector within the chamber housing to purify the introduced air through the intake duct; and wherein the introduced air through the intake duct is supplied into the engine with the air introduced from the main duct through the air hose when the variable valve is opened.

2. The intake apparatus of claim 1, wherein a first magnet fixed to an end of the variable valve is attached to a second magnet fixed to the vicinity of the intake duct when the air suction pressure is below the predetermined value such that air is not introduced into the intake duct due to a magnetic force between the first and second magnets being stronger than the air suction pressure, and the first magnet is separated from the second magnet when the air suction pressure is beyond the predetermined value such that air is introduced into the intake duct due to the magnetic force between the first and second magnets being weaker than the air suction pressure.

3. The intake apparatus of claim 1, wherein the filter element is slidably mounted to the chamber housing through a hole formed to a chamber cover configured to cover the chamber housing such that the air introduced from the intake duct is purified through the filter element.

* * * * *